(12) United States Patent
Costenaro et al.

(10) Patent No.: US 8,965,983 B2
(45) Date of Patent: Feb. 24, 2015

(54) CHANGES TO DOCUMENTS ARE AUTOMATICALLY SUMMARIZED IN ELECTRONIC MESSAGES

(75) Inventors: Daniel Paul Costenaro, Bellevue, WA (US); Jedidiah Brown, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/102,431

(22) Filed: May 6, 2011

(65) Prior Publication Data

US 2012/0284344 A1 Nov. 8, 2012

(51) Int. Cl.
*G06F 15/16* (2006.01)
*G06F 17/22* (2006.01)
*G06Q 10/10* (2012.01)

(52) U.S. Cl.
CPC ............ *G06F 17/2288* (2013.01); *G06Q 10/10* (2013.01)
USPC ........... 709/206; 715/230; 715/255; 715/253; 715/732; 715/751; 705/34; 705/311

(58) Field of Classification Search
USPC .......... 709/206; 715/230, 253, 255, 732, 751; 705/34, 311
See application file for complete search history.

(56) References Cited

U.S. PATENT DOCUMENTS

| | | | |
|---|---|---|---|
| 5,355,472 A | 10/1994 | Lewis | |
| 5,787,480 A | 7/1998 | Scales et al. | |
| 5,864,870 A | 1/1999 | Guck | |
| 5,903,723 A | 5/1999 | Beck | 709/200 |
| 6,219,818 B1 | 4/2001 | Freivald et al. | 714/799 |
| 6,275,850 B1 | 8/2001 | Beyda | 709/206 |
| 6,314,425 B1 | 11/2001 | Serbinis et al. | 1/1 |
| 6,493,758 B1 | 12/2002 | McLain | |
| 6,533,822 B2 * | 3/2003 | Kupiec | 715/253 |
| 6,687,741 B1 | 2/2004 | Ramaley et al. | 709/206 |

(Continued)

FOREIGN PATENT DOCUMENTS

| | | |
|---|---|---|
| JP | 2008-500646 | 1/2008 |
| WO | 2007/133504 | 11/2007 |
| WO | 2009023769 A1 | 2/2009 |

OTHER PUBLICATIONS

Office Action dated Jun. 20, 2012, issued in U.S. Appl. No. 13/096,899.

(Continued)

*Primary Examiner* — Kyung H Shin
(74) *Attorney, Agent, or Firm* — Louise Bowman; Jim Ross; Micky Minhas

(57) ABSTRACT

Changes made to a document are automatically summarized within an electronic message. The changes may be made to a document that is being collaborated on. For example, the document may be an attachment to an electronic message, a link to a shared document that is contained within the electronic message and/or a document that is being shared between a different users. The document may be any type of file to which changes/comments are made, such as word processing documents, spreadsheets, slides, and the like. A reviewer may make many different types of changes to the document (e.g. deleting/adding content, adding comments, and the like). After making any changes to the document, a summary of the changes is automatically inserted into an electronic message that is then sent to one or more recipients. Live information relating to the document may also be displayed with one or more electronic messages.

20 Claims, 9 Drawing Sheets

(56) References Cited

U.S. PATENT DOCUMENTS

| | | | |
|---|---|---|---|
| 6,718,368 B1 | 4/2004 | Ayyadurai | |
| 6,763,496 B1 | 7/2004 | Hennings et al. | |
| 6,782,423 B1 | 8/2004 | Nakayama et al. | |
| 6,839,741 B1 | 1/2005 | Tsai | |
| 6,883,009 B2 | 4/2005 | Yoo | |
| 6,954,934 B2 | 10/2005 | Kumar | |
| 6,978,276 B2 | 12/2005 | Demsky et al. | |
| 7,003,551 B2 | 2/2006 | Malik | |
| 7,028,075 B2 | 4/2006 | Morris | 709/206 |
| 7,054,905 B1 | 5/2006 | Hanna et al. | |
| 7,089,287 B2 | 8/2006 | Bellotti et al. | |
| 7,107,518 B2 | 9/2006 | Ramaley et al. | 715/235 |
| 7,113,948 B2 | 9/2006 | Jhingan et al. | |
| 7,127,670 B2 | 10/2006 | Bendik | 715/200 |
| 7,130,885 B2 | 10/2006 | Chandra et al. | 709/206 |
| 7,143,091 B2 | 11/2006 | Charnock et al. | |
| 7,178,099 B2 | 2/2007 | Meyer et al. | 715/210 |
| 7,194,514 B1 | 3/2007 | Yen et al. | 709/206 |
| 7,290,034 B2 | 10/2007 | Budd et al. | |
| 7,353,232 B1 | 4/2008 | Kalucha et al. | |
| 7,392,280 B2 | 6/2008 | Rohall et al. | 709/201 |
| 7,401,291 B2 | 7/2008 | Ramaley et al. | |
| 7,409,394 B2 | 8/2008 | Lee | 1/1 |
| 7,409,424 B2 | 8/2008 | Parker | 709/206 |
| 7,424,676 B1 | 9/2008 | Carlson et al. | |
| 7,444,382 B2 | 10/2008 | Malik | |
| 7,509,386 B2 | 3/2009 | Miyashita | |
| 7,536,440 B2 | 5/2009 | Budd et al. | 709/206 |
| 7,546,352 B1 | 6/2009 | Bhattiprolu et al. | |
| 7,565,409 B2 | 7/2009 | Heilbron et al. | |
| 7,580,982 B2 | 8/2009 | Owen et al. | |
| 7,593,943 B2 | 9/2009 | Clarke et al. | 1/1 |
| 7,650,387 B2 | 1/2010 | Foo | 709/214 |
| 7,730,082 B2 | 6/2010 | Sah et al. | 707/770 |
| 7,752,269 B2 | 7/2010 | Chan et al. | |
| 7,783,711 B2 | 8/2010 | LeVasseur et al. | |
| 7,783,972 B2 | 8/2010 | Camps et al. | 715/255 |
| 7,840,642 B2 | 11/2010 | Naick et al. | |
| 7,908,332 B2 | 3/2011 | Malik | |
| 8,108,464 B1 | 1/2012 | Rochelle et al. | |
| 8,140,975 B2 | 3/2012 | Lemay et al. | |
| 8,145,707 B2 | 3/2012 | Thayer et al. | |
| 8,176,123 B1 | 5/2012 | Wang et al. | |
| 8,185,591 B1 | 5/2012 | Lewis | |
| 8,458,269 B2 | 6/2013 | Friedman et al. | |
| 8,682,989 B2 | 3/2014 | Meisels et al. | |
| 2001/0051991 A1 | 12/2001 | Beyda et al. | |
| 2001/0054073 A1 | 12/2001 | Ruppert et al. | |
| 2002/0016818 A1 | 2/2002 | Kirani et al. | |
| 2002/0059384 A1 | 5/2002 | Kaars | |
| 2002/0062356 A1 | 5/2002 | Clarke et al. | |
| 2002/0065892 A1 | 5/2002 | Malik | |
| 2002/0107931 A1 | 8/2002 | Singh et al. | |
| 2002/0129056 A1* | 9/2002 | Conant et al. | 707/511 |
| 2002/0143691 A1 | 10/2002 | Ramaley et al. | |
| 2002/0174010 A1 | 11/2002 | Rice | |
| 2003/0028528 A1 | 2/2003 | Christensen et al. | |
| 2003/0055907 A1 | 3/2003 | Stiers | 709/206 |
| 2004/0034688 A1 | 2/2004 | Dunn | |
| 2004/0068545 A1 | 4/2004 | Daniell et al. | |
| 2004/0103044 A1 | 5/2004 | Vandewater et al. | 705/26.1 |
| 2004/0158607 A1 | 8/2004 | Coppinger et al. | 709/206 |
| 2004/0186894 A1 | 9/2004 | Jhingan et al. | 709/207 |
| 2004/0243672 A1 | 12/2004 | Markki et al. | |
| 2005/0010799 A1 | 1/2005 | Kelley et al. | |
| 2005/0033813 A1 | 2/2005 | Bhogal et al. | |
| 2005/0044492 A1 | 2/2005 | Ramaley et al. | |
| 2005/0060382 A1 | 3/2005 | Spector | 709/213 |
| 2005/0114672 A1 | 5/2005 | Duncan et al. | |
| 2005/0122345 A1 | 6/2005 | Kim et al. | |
| 2005/0166154 A1 | 7/2005 | Wilson | 715/751 |
| 2005/0188026 A1 | 8/2005 | Hilbert et al. | 709/206 |
| 2005/0251443 A1 | 11/2005 | Chan | 705/14.721 |
| 2005/0289221 A1 | 12/2005 | Steele | |
| 2006/0004819 A1 | 1/2006 | Claudatos et al. | |
| 2006/0020673 A1 | 1/2006 | Sorge et al. | |
| 2006/0031309 A1 | 2/2006 | Luoffo et al. | 709/206 |
| 2006/0075046 A1 | 4/2006 | Yozell-Epstein et al. | |
| 2006/0095527 A1 | 5/2006 | Malik | |
| 2006/0195526 A1 | 8/2006 | Lederer | 709/206 |
| 2006/0206570 A1 | 9/2006 | Heidloff et al. | 709/206 |
| 2006/0259524 A1 | 11/2006 | Horton | 1/1 |
| 2006/0282762 A1 | 12/2006 | Diamond et al. | 715/235 |
| 2006/0294455 A1 | 12/2006 | Morris et al. | |
| 2007/0005717 A1 | 1/2007 | LeVasseur et al. | |
| 2007/0022166 A1 | 1/2007 | Bhogal et al. | 709/206 |
| 2007/0118794 A1 | 5/2007 | Hollander et al. | |
| 2007/0130259 A1 | 6/2007 | Daniell et al. | |
| 2007/0136814 A1 | 6/2007 | Lee et al. | |
| 2007/0143419 A1 | 6/2007 | Plas | 709/206 |
| 2007/0143425 A1 | 6/2007 | Kieselbach et al. | 709/206 |
| 2007/0168459 A1 | 7/2007 | Fujita et al. | |
| 2007/0192490 A1 | 8/2007 | Minhas | |
| 2007/0198913 A1 | 8/2007 | Terao et al. | |
| 2007/0208782 A1 | 9/2007 | Carter et al. | |
| 2007/0233794 A1 | 10/2007 | Singh | |
| 2007/0271344 A1 | 11/2007 | Danasekaran et al. | |
| 2007/0271502 A1 | 11/2007 | Bedi et al. | |
| 2007/0283267 A1 | 12/2007 | Jeffrey et al. | |
| 2008/0005139 A1 | 1/2008 | Hysom et al. | |
| 2008/0028017 A1 | 1/2008 | Garbow et al. | |
| 2008/0059539 A1 | 3/2008 | Chin et al. | |
| 2008/0120382 A1 | 5/2008 | Heidloff et al. | |
| 2008/0250474 A1 | 10/2008 | Bhogal et al. | |
| 2008/0281924 A1 | 11/2008 | Gadwale | 709/206 |
| 2008/0282159 A1 | 11/2008 | Vanderwende et al. | 715/700 |
| 2008/0288862 A1 | 11/2008 | Smetters et al. | |
| 2009/0006948 A1* | 1/2009 | Parker et al. | 715/255 |
| 2009/0024931 A1 | 1/2009 | Bae | |
| 2009/0030919 A1 | 1/2009 | Brezina et al. | |
| 2009/0030997 A1 | 1/2009 | Malik | |
| 2009/0063520 A1 | 3/2009 | Kimura | |
| 2009/0094514 A1 | 4/2009 | Dargahl et al. | |
| 2009/0100109 A1 | 4/2009 | Turski et al. | |
| 2009/0157831 A1 | 6/2009 | Tian et al. | 709/206 |
| 2009/0187852 A1 | 7/2009 | Tsuruta | |
| 2009/0210721 A1 | 8/2009 | Phillips | |
| 2009/0248808 A1 | 10/2009 | Izumi | 709/206 |
| 2009/0313256 A1 | 12/2009 | Konduri et al. | 1/1 |
| 2009/0319618 A1 | 12/2009 | Affronti et al. | 709/206 |
| 2010/0011032 A1 | 1/2010 | Fukuoka | |
| 2010/0017701 A1* | 1/2010 | Bargeron et al. | 715/230 |
| 2010/0023492 A1 | 1/2010 | Lucas | |
| 2010/0057765 A1 | 3/2010 | Dispensa et al. | 707/102 |
| 2010/0057864 A1 | 3/2010 | Laird-McConnell | |
| 2010/0070448 A1 | 3/2010 | Omoigui | |
| 2010/0070588 A1 | 3/2010 | Sinn et al. | |
| 2010/0082713 A1 | 4/2010 | Frid-Nielsen et al. | 707/821 |
| 2010/0095198 A1 | 4/2010 | Bultrowicz et al. | 715/234 |
| 2010/0125640 A1 | 5/2010 | Boddington et al. | |
| 2010/0169295 A1 | 7/2010 | Kanamori | |
| 2010/0169439 A1 | 7/2010 | O'Sullivan et al. | |
| 2010/0169440 A1 | 7/2010 | O'Sullivan et al. | 709/206 |
| 2010/0191774 A1 | 7/2010 | Mason et al. | |
| 2010/0198927 A1 | 8/2010 | Tonnison et al. | 709/206 |
| 2010/0228611 A1 | 9/2010 | Shenfield | |
| 2010/0228989 A1 | 9/2010 | Neystadt et al. | |
| 2010/0235763 A1 | 9/2010 | Massand | |
| 2010/0281224 A1 | 11/2010 | Ho et al. | |
| 2010/0306180 A1 | 12/2010 | Johnson et al. | |
| 2010/0306330 A1 | 12/2010 | Friedman | 709/206 |
| 2011/0066955 A1 | 3/2011 | Olson et al. | |
| 2011/0113104 A1 | 5/2011 | Bhogal et al. | |
| 2011/0145363 A1 | 6/2011 | Ananthanarayanan et al. | |
| 2011/0276897 A1 | 11/2011 | Crevier et al. | |
| 2012/0095890 A1* | 4/2012 | Santarlas | 705/34 |
| 2012/0151379 A1 | 6/2012 | Schultz et al. | |
| 2012/0192064 A1* | 7/2012 | Antebi et al. | 715/255 |
| 2012/0278281 A1 | 11/2012 | Meisels et al. | |
| 2012/0278401 A1 | 11/2012 | Meisels et al. | |
| 2012/0278402 A1 | 11/2012 | Limont et al. | |
| 2012/0278403 A1 | 11/2012 | Costenaro et al. | |
| 2012/0278404 A1 | 11/2012 | Meisels et al. | |
| 2012/0278405 A1 | 11/2012 | Costenaro et al. | |

(56) References Cited

U.S. PATENT DOCUMENTS

| | | |
|---|---|---|
| 2012/0278407 A1 | 11/2012 | Meisels et al. |
| 2012/0284345 A1 | 11/2012 | Costenaro et al. |
| 2014/0173423 A1 | 6/2014 | Meisels et al. |

OTHER PUBLICATIONS

Office Action dated Sep. 7, 2012, issued in U.S. Appl. No. 12/963,0919.
Office Action dated Oct. 3, 2012, issued in U.S. Appl. No. 12/096,830.
Decouchant et al.; "Griffon: A Cooperative, Structured, Distributed Document Editor"; 1993; http://citeseerx.ist.psu.edu/viewdoc/download?doi=10.1.1.51.759&rep=rep1&type=pdf; 28 pages.
Devendorf, G.; "Outlook putting attachments in Sharepoint"; Feb. 13, 2008; http://my.advisor.com/blog/garydev.nsf/d6plinks/GDEF-7BSUA2; 5 pages.
Edholm, Y.; "Email Attachments: The Scourge of the Network"; Jul. 21, 2008; solutions-daily.com; http://www.solutions-daily.com/dsp_getFeaturesDetails.cfm?CID=691; 3 pg.s.
Egnyte.co; "Cloud File Server Features—Complete List"; accessed Dec. 30, 2010, at http://www.egnyte.co.uk/file-server/online-file-server-features.html; 5 pgs.
Gigaom.com; "*How to Use Adobe Acrobat for Online Document Reviews*"; Retrieved Date: Jan. 4, 2010; http://gigaom.com/collaboration/how-to-use-adobe-acrobat-for-online-document-reviews/; 8 pgs.
Harmoni.ie; "harmon.ie for SharePoint"; accessed Apr. 1, 2011 at http://harmon.ie/SharePoint/Product/Features/CollaborateUsingDocuments; 3 pgs.
Hsieh, H., et al.; "Activity Links: Supporting Communication and Reflection about Action"; Center for the Study of Digital Libraries and Dept. of Computer Science, Texas A&M University, USA; HT '05 Sep. 6-9, 2005, Salzburg, AT; 10 pgs.
Lenahan, T.; "5 New Google Docs Features You Might Have Missed"; Apr. 6, 2010; http://www.makeuseof.com/tag/5-google-docs-features-making/; 9 pgs.
Masternewmedia.org; "*Collaborative Document Review Online: PleaseReview*"; Retrieved Date: Jan. 4, 2010; http://www.masternewmedia.org/news/2005/06/02/collaborative_document_review_online_pleasereview.htm; 4 pgs.
McCoy, J., et al.; "SharePoint Workspace and the Office Document Cache"; Mar. 12, 2010-Sep. 29, 2010; retrieved Dec. 30, 2010, at http://blogs.msdn.com/b/sharepoint_workspace_development_team/archive/2010/03/12/sharepoint-workspace-and-the-office-document-cache.aspx; 2 pgs.
Microsoft Support; "Attachment Manager for Outlook"; accessed Jan. 7, 2011, at http://assistmyteam.com/downloads/manuals/AttachmentManager.pdf; 14 pgs.
Microsoft Support; "OL2000: Changing from Local Delivery to Server and Offline"; Oct. 8, 2003, rev. 1.0; accessed Jan. 7, 2011 at http://support.microsoft.com/kb/197651; 4 pgs.
Microsoft Support; "You may receive an 'Outlook blocked access to the following potentially unsafe attachments' message in Outlook"; Last Review: May 13, 2010; http://support.microsoft.com/kb/829982; 7 pgs.
Microsoft; "*Going beyond e-mail: Collaborating with Office*"; Retrieved Date: Jan. 4, 2010; http://office.microsoft.com/en-us/outlook-help/going-beyond-e-mail-collaborating-with-office-HA001017429.aspx; 10 pgs.
Office-Addins.com; "Attachments Processor for Microsoft Outlook"; accessed Jan. 6, 2011, at http://www.- office-addins.com/-outlook-addins/attachments-processor.html; 3 pgs.
phpBB—Free and Open Source Forum Software; "Display last edited time information"; accessed Jan. 6, 2011, at http://www.phpbb.com/community/viewtopic.php?f=46&t=589514; 7 pgs.
Redline-Software.com; "Outlook Connector for MDaemon"; accessed Jan. 6, 2011, at http://www.redline-software.com/eng/support/docs/mdaemon/c6s4.php; 7 pgs.
RSBR.de; "Outlook Attachment Sniffer"; accessed Jan. 6, 2011, at http://www.rsbr.de/Software/OASniffer/index.htm; 2 pgs.
Sharepoint Development; "How to show last modified workflow date in a column on the main list page"; Jul. 31, 2009-Aug. 4, 2009; accessed Jan. 6, 2011, at http://www.sharepointdev.net/sharepoint--design-customization/how-to-show-last-modified-workflow-date--in-a-column-on-the-main-list-page-5094.shtml; 4 pgs.
Thapa, S.; "Microsoft SharePoint 2010—Features and Benefits"; Dec. 1, 2010; EzineMark.com; 3 pgs.
The Daily Reviewer; "Outlook Shared Attachment as Hyperlink"; accessed Dec. 30, 2010, at http://thedailyreviewer.com/windowsapps/view/outlook-shared-attachment-as-hyperlink-11367085; 5 pgs.
U.S. Appl. No. 12/963,091, entitled *Shared Attachments*, filed Dec. 8, 2010.
U.S. Appl. No. 13/096,830 entitled *Making Document Changes by Replying to Electronic Messages*, filed Apr. 28, 2011.
U.S. Appl. No. 13/096,854 entitled *Presenting Links to Content as Attachments in Electronic Messages*, filed Apr. 28, 2011.
U.S. Appl. No. 13/096,869, entitled *Presenting Link Information Near Links Within Electronic Messages*, filed Apr. 28, 2011.
U.S. Appl. No. 13/096,880, entitle *Upload of Attachment and Insertion of Link Into Electronic Messages*, filed Apr. 28, 2011.
U.S. Appl. No. 13/096,899, entitled *Storing Metadata Inside File to Reference Shared Version of File*, filed Apr. 28, 2011.
U.S. Appl. No. 13/102,875, entitled *Setting Permissions for Links Forwarded in Electronic Messages*, filed May 6, 2011.
U.S. Appl. No. 13/096,936, entitled *Automatic Uploading of Attachment to a Shared Location*, filed Apr. 28, 2011.
Jatowt, A., et al.; "*Change Summarization in Web Collections*"; University of Tokyo, Japan; 2004; accessed on or about Jan. 4, 2010 at http://citeseerx.ist.psu.edu/viewdoc/download?doi=10.1.1.73.7999&rep=rep1&type=pdf; 10 pgs.
Office Action dated Sep. 24, 2013, issued in U.S. Appl. No. 13/096,899.
Office Action dated Nov. 22, 2013, issued in U.S. Appl. No. 13/102,875.
PCT Search Report in PCT/US2012/035707 dated Nov. 26, 2012.
PCT Search Report in PCT/US2012/035708 dated Nov. 26, 2012.
PCT Search Report in PCT/US2012/035709 dated Nov. 26, 2012.
PCT Search Report in PCT/US2012/036701 dated Nov. 28, 2012.
PCT Search Report in PCT/US2012/036702 dated Dec. 3, 2012.
Office Action dated Nov. 21, 2012, issued in U.S. Appl. No. 13/096,936.
Office Action dated Dec. 11, 2012, issued in U.S. Appl. No. 13/096,854.
Office Action dated Dec. 14, 2012, issued in U.S. Appl. No. 13/096,869.
Office Action dated Dec. 26, 2012, issued in U.S. Appl. No. 13/096,880.
Office Action dated Jan. 2, 2013, issued in U.S. Appl. No. 13/102,875.
Office Action dated Jan. 9, 2013, issued in U.S. Appl. No. 12/963,091.
Office Action dated Jan. 15, 2014, issued in U.S. Appl. No. 13/096,854.
Office Action dated Jan. 31, 2014, issued in U.S. Appl. No. 13/096,869.
Office Action dated Feb. 11, 2013, issued in U.S. Appl. No. 13/096,899.
Wikipedia, Message, http://en.wikipedia.org/wikiIMessage retrieved Jan. 9, 2014, p. 1-2.
Office Action dated Jun. 16, 2014, issued in U.S. Appl. No. 12/963,091, 22 pgs.
Docstoc; "OneClick: Email Large Documents Without Attaching Files"; retrieved Jan. 7, 2011, from http://www.docstoc.com/oneclick/; 4 pgs.
Masternewmedia.com; "How to Send Large Files without Email"; Last updated: Jan. 6, 2011; retrieved Jan. 7, 2011, from http://www.masternewmedia.org/how_to_send_large_files_without_email/; 3 pgs.

(56) References Cited

OTHER PUBLICATIONS

MSDN.com; "How to Share Large Files Without Attaching Them"; Aug. 21, 2008; retrieved Jan. 7, 2011, from http://blogs.msdn.com/b/outlook/archive/2008/08/21/how-to-share-large-files-without-attaching-them.aspx; 3 pgs.
Sendthisfile.com; "Welcome to SendThisFile"; accessed Jan. 7, 2011, from http://www.sendthisfile.com/; 1 pg.
Office Action dated Jun. 4, 2013, issued in U.S. Appl. No. 13/096,936.
Office Action dated Jun. 11, 2013, issued in U.S. Appl. No. 13/096,910.
Office Action dated Jun. 20, 2013, issued in U.S. Appl. No. 13/096,854.
Office Action dated Jun. 21, 2013, issued in U.S. Appl. No. 13/096,830.
Office Action dated Jun. 21, 2013, issued in U.S. Appl. No. 13/096,869.
Office Action dated Jul. 16, 2013, issued in U.S. Appl. No. 13/096,880.
EP Extended Search Report in PCT/US2012/036702 dated Aug. 12, 2014, 6 pgs.
Office Action dated Jul. 10, 2014, issued in U.S. Appl. No. 13/096,869, 29 pgs.
Office Action dated Aug. 14, 2014, issued in U.S. Appl. No. 13/096,854, 32 pgs.
PCT Search Report in PCT/US2012/035710 dated Sep. 28, 2012.
Office Action dated Nov. 13, 2012, issued in U.S. Appl. No. 13/096,910.
Troost et al., Internet Engineering Task Force, RFC 2183 dated Aug. 1997, 12 pgs. available at: www.rfc-editor.org/rfc/rfc2183.txt.
Office Action dated Sep. 25, 2014, issued in U.S. Appl. No. 12/963,091, 24 pgs.
Office Action dated Sep. 26, 2014, issued in U.S. Appl. No. 13/096,936, 29 pgs.
Office Action dated Oct. 6, 2014, issued in U.S. Appl. No. 13/096,880, 31 pgs.
Office Action dated Oct. 7, 2014, issued in U.S. Appl. No. 13/096,910, 32 pgs.
Office Action dated Oct. 23, 2014, issued in U.S. Appl. No. 13/096,899, 24 pgs.
EP Extended Search Report in PCT/US2012/035707 dated Oct. 21, 2014, 6 pgs.
EP Search Report in PCT/US2012/036701 dated Dec. 4, 2014, 5 pgs.

\* cited by examiner

CHANGES TO DOCUMENTS ARE AUTOMATICALLY SUMMARIZED IN ELECTRONIC MESSAGES

BACKGROUND

Authors of documents routinely email documents to other users for review. A user receiving the document for review opens the attached document, makes changes/comments in the document and emails the document back to the author. It is often difficult for users to keep up with all of the different changes made to the document by their co-authors or editors.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Changes made to a document are automatically summarized within an electronic message. The changes may be made to a document that is being collaborated on. For example, the document may be an attachment to an electronic message, a link to a shared document that is contained within the electronic message and/or a document that is being shared between a different users. The document may be any type of file to which changes/comments are made, such as word processing documents, spreadsheets, slides, and the like. A reviewer may make many different types of changes to the document (e.g. deleting/adding content, adding comments, and the like). After making any changes to the document, a summary of the changes is automatically inserted into an electronic message that is then sent to one or more recipients. Live information relating to the document may also be included with a display of one or more electronic messages. The live information may include information such as who is currently editing the document, who has edited the document, a current state of the document, content changes to the document, and the like.

DETAILED DESCRIPTION

Figure 1:
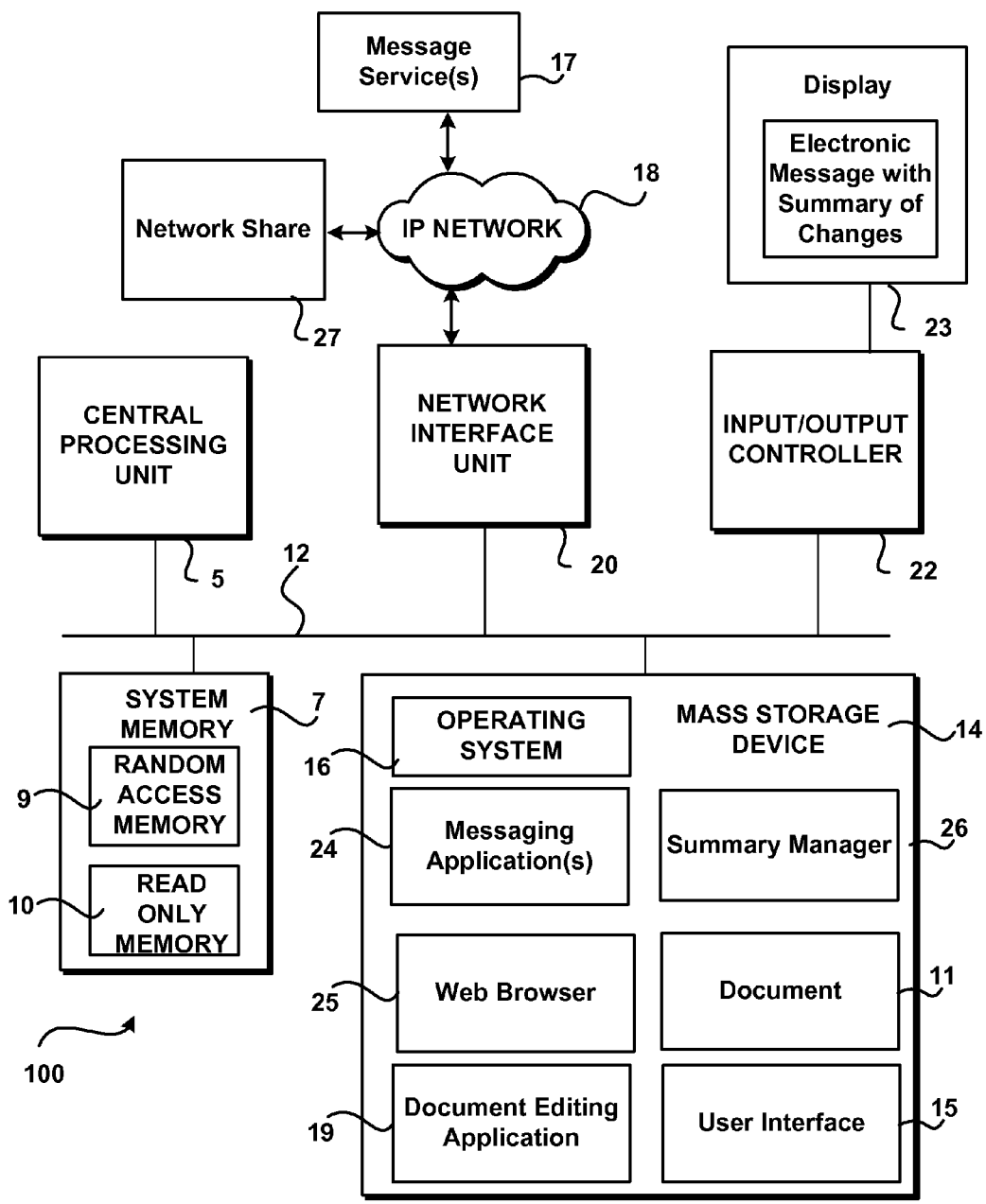
FIG. 1 illustrates an exemplary computing environment.

Referring now to the drawings, in which like numerals represent like elements, various embodiment will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an illustrative computer environment for a computer 100 utilized in the various embodiments will be described. The computer environment shown in FIG. 1 includes computing devices that each may be configured as a mobile computing device (e.g. phone, tablet, net book, laptop), server, a desktop, or some other type of computing device and includes a central processing unit 5 ("CPU"), a system memory 7, including a random access memory 9 ("RAM") and a read-only memory ("ROM") 10, and a system bus 12 that couples the memory to the central processing unit ("CPU") 5.

A basic input/output system containing the basic routines that help to transfer information between elements within the computer, such as during startup, is stored in the ROM 10. The computer 100 further includes a mass storage device 14 for storing an operating system 16, document 11, messaging application(s) 24, Web Browser 25, document editing application 19 and summary manager 26 which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, Erasable Programmable Read Only Memory ("EPROM"), Electrically Erasable Programmable Read Only Memory ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

Computer 100 operates in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, including a keyboard, mouse, or electronic stylus (not shown in FIG. 1). Similarly, an input/output controller 22 may provide input/output to a display screen 23, a printer, or other type of output device.

As mentioned briefly above, a number of program modules and data files may be stored in the mass storage device 14 and RAM 9 of the computer 100, including an operating system 16 suitable for controlling the operation of a computer, such as the WINDOWS PHONE 7®, WINDOWS 7®, or WINDOWS SERVER® operating system from MICROSOFT CORPORATION of Redmond, Wash. The mass storage device 14 and RAM 9 may also store one or more program modules. In particular, the mass storage device 14 and the RAM 9 may store one or more application programs, including a document editing application 19, messaging application(s) 24 and Web Browser 25. According to an embodiment, the document editing application 19 is a word processing application, such as the MICROSOFT WORD application. Other document editing applications may also be used. The document editing application may be configured to interact with documents, such as spreadsheets, slides, notes, and the like.

A user interface 15 is used by a user to interact with applications and documents. For example, document 11 may be edited using the user interface. Document editing application 19 is configured to perform editing operations on a document, such as document 11. For example, a user may change/add/remove words from a document, change the formatting of the document, add a picture, table, and the like using document editing application 19.

Messaging application(s) 24 may be one or more different messaging applications. For example, computing device 100 may include an email application, an Instant Messaging (IM) application, an SMS, MMS application, a real-time information network (e.g. Twitter® interface), a social networking application, and the like. According to an embodiment, messaging application 24 is an email application, such as MICROSOFT OUTLOOK®. The messaging application(s) may be client based and/or web based. For example, a network based message service 17 may be used, such as: MICROSOFT WINDOWS LIVE or some other network based email and messaging service.

Network share 27 is configured to store documents that are accessible to one or more users through IP network 18. For example, network share 27 may store a document that is being collaborated on by different reviewers located at one or more locations. A document may be stored in more than one location. For example, a copy of document 11 may be stored on computing device 100 and at network share 27. A copy of the document may also be maintained in other locations (e.g. within a mailbox as an attachment to an electronic message).

Summary manager 26 is configured to automatically include summary information such as current live information and/or latest information relating to the document and/or a summary of changes made to a document within an electronic message that is sent to one or more recipients. Summary manager 26 may be located externally from an application (e.g. document editing application 19 and/or messaging application(s) 24) as shown or may be a part of an application, such as document editing application 19, messaging application 24 and/or some other application. Further, all/some of the functionality provided by summary manager 26 may be located internally/externally from an application.

Changes made to a document are automatically summarized within an electronic message. Generally, the changes are made to a document that is being collaborated on. For example, the document may be an attachment to an electronic message, a link to a shared document that is contained within an electronic message, and/or a document that is being shared between a different users. The document may be any type of file to which changes/comments are made, such as word processing documents, spreadsheets, slides, and the like. A reviewer may make many different types of changes to the document (e.g. deleting/adding content, adding comments, and the like). Summary manager 26 creates a summary of the changes to the document and automatically inserts the summary into an electronic message that is then sent to one or more recipients. For example, when the changes are made to an attachment/link to the electronic message, summary manager 26 inserts the summary in a reply to the electronic message. When the changes are made to a shared document (e.g. a document stored at a network share), an electronic message is created that includes the summary.

Live information relating to document may also be included with a display of one or more electronic messages. The live information may include information such as who is currently editing the document, who has edited the document, a current state of the document, a content change summary, and the like. The live information may change and be re-displayed while a user is looking at a message such that the live information is updated in real-time. More details regarding the summary manager are disclosed below.

Figure 2:
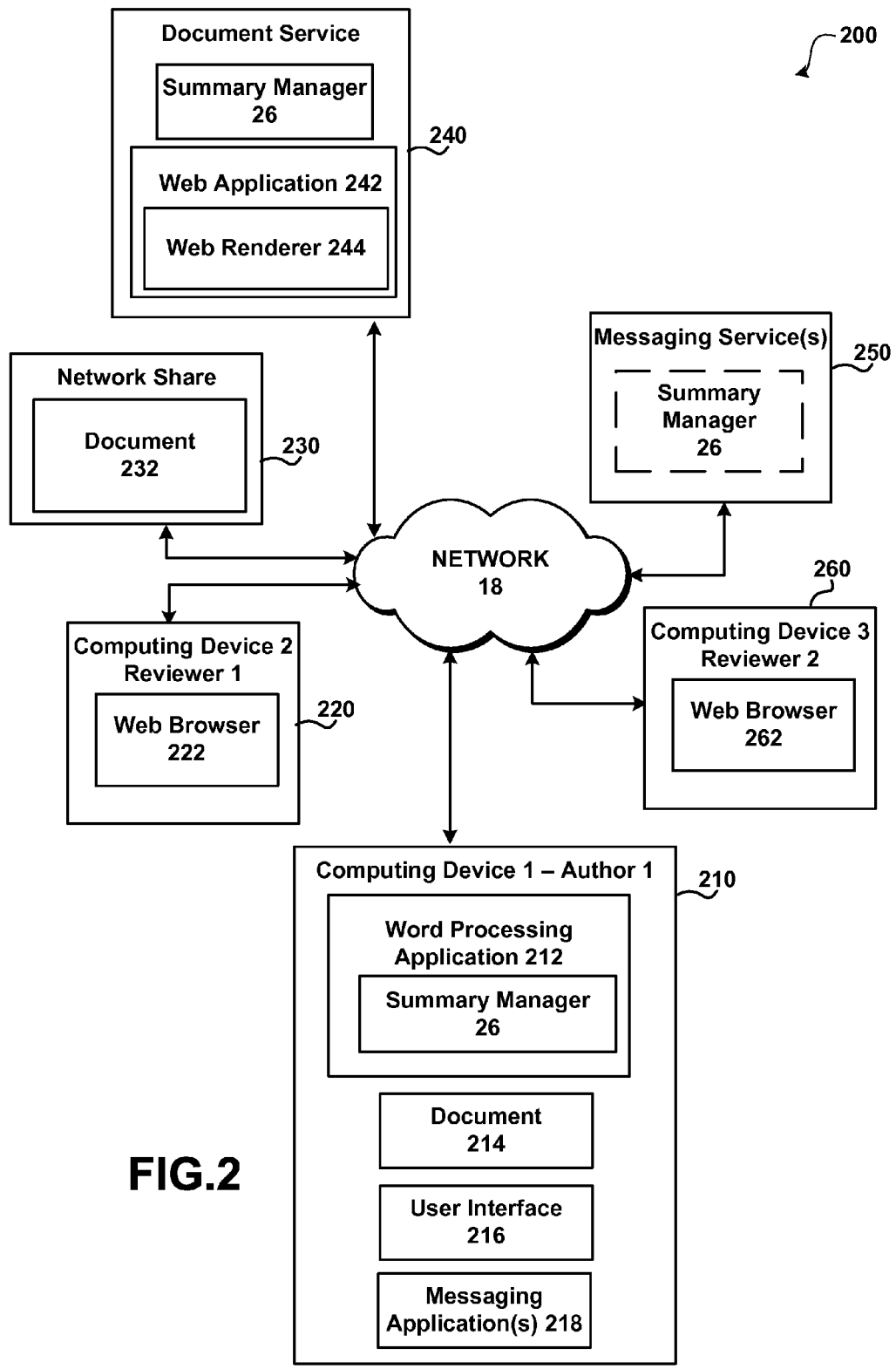
FIG. 2 shows a system for including a summary of changes made to a document within an electronic message.

FIG. 2 shows a system for including a summary of changes made to a document within an electronic message. As illustrated, system 200 includes computing device 1 (210), computing device 2 (220), network share 230, document service 240, messaging service 250 and computing device 3 (260).

The computing devices may be any type of computing device that is configured to perform the operations relating to sending/receiving electronic messages and making changes to documents. For example, some of the computing devices may be: mobile computing devices (e.g. cellular phones, tablets, smart phones, laptops, and the like); desktop computing devices and servers. Some computing devices may be arranged to provide an online cloud based service (e.g. document service 240 that is configured for interacting with documents online), some may be arranged as data shares, some may be arranged in local networks, some may be arranged in networks accessible through the Internet, and the like.

The computing devices are coupled through network 18. Network 18 may be many different types of networks. For example, network 18 may be an IP network, a carrier network for cellular communications, and the like. Generally, network 18 is used to transmit data between computing devices, such as computing device 1, computing device 2, computing device 3, network share 230, document service 240 and messaging service 250.

Computing device 1 includes word processing application 212, document 214, user interface 216 and messaging application 218. As illustrated, computing device 1 is used by a user to interact with documents, such as attachments to electronic messages, document 214, documents in a network share (e.g. document 232) and the like.

User interface (UI) 216 is used to interact with a document, such as document 214. One or more user interfaces of one or more types may be used to interact with the document. For example, UI 216 may include the use of a context menu, a menu within a menu bar, a menu item selected from a ribbon user interface, a graphical menu, and the like. Generally, UI 216 is configured such that a user may easily interact with a document. For example, a user may utilize UI 216 to open a document that is attached/linked to an electronic message and to make changes to the document. UI 216 may also be used to create electronic messages (e.g. new electronic messages, replies to electronic messages) that are addressed to other reviewers that are collaborating on the document.

Messaging application 218 may be a client based application, such as an email application, a Instant Messaging Application, a social media application, and the like. Generally, messaging application 218 may be used to send electronic messages of one or more types to the reviewers that are collaborating on a document. A network based messaging application may be used in addition to messaging application(s) 218 or instead of one or more of the different messaging applications. For example, a web interface may be used to access a messaging service.

Summary manager 26 determines summary information such as current live information relating to the document and/or changes made to a document and creates an electronic message that includes a summary of the changes. Summary manager 26 displays the live information with a display of one or more messages and sends an electronic message including the summary of the changes to one or more of the collaborators of the document. For example, a document may be collaborated on by author 1 using computing device 1, reviewer 1 using computing device 2 and reviewer 2 using computing device 3. Initially, Author 1 may create a document, such as document 214 that is designated to be shared on network share 230 (e.g. document 232) that requires input from one or more reviewers (e.g. Reviewer 1 and Reviewer 2). Author 1 may attach the document and/or a link to the document to an electronic message that is delivered to reviewer 1 and reviewer 2 for review. According to another embodiment, the reviewers may obtain the document directly from the document share for editing.

Figure 6:
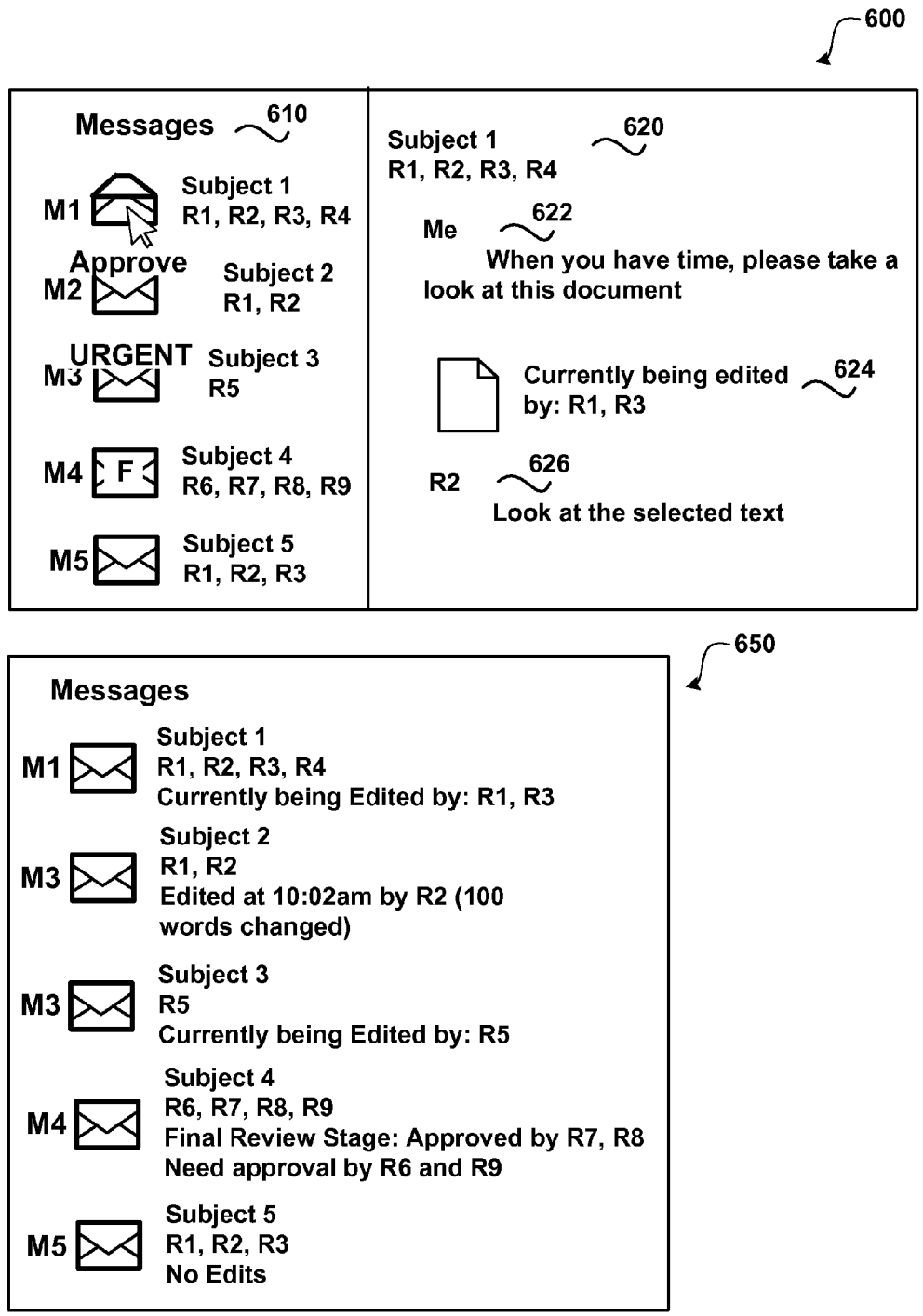
FIG. 6 illustrates an example of showing live information with a display of messages.

When viewing a list of messages, a reviewer (e.g. Reviewer 1 and Reviewer 2) may look at a summary of live information for each of the messages that is displayed (see FIG. 6 and related discussion). The live information is directed at providing a user with a current state of the document (e.g. who is currently editing the document, who is assigned to review the document, is the document in a draft state?, a final state?, a summary of changes made to the document, a last change to the document, and the like). Different live information may be displayed when a message is selected for viewing. For example, when a message is selected from a displayed list of messages, the live information may include more/different live information then displayed with the list of messages. The live information may change and be updated while a viewer is looking at the message(s).

Reviewer 1 and/or Reviewer 2 may make changes to the document. For example, Reviewer 1 may open the attached document from an electronic message and make changes. Reviewer 2 may open the document from network share 230. In response to the changes made by a reviewer, summary manager 26 creates a summary of the changes and includes the summary within an electronic message that is addressed to the other reviewers of the document. Different recipients may be selected for the electronic message. In the case of the changes being made to the attached/linked document, the summary is placed within a reply to the electronic message. In the case of the changes being made directly to the document at a network share, a new message may be created by summary manager 26 that includes the summary.

The summary may contain different information. For example, the summary may include current live information relating to the document, all of the changes made to the document, a portion of the changes made to the document and/or statistical information relating to the changes to the document. According to an embodiment, the amount of information included in the summary depends on the number of changes made to the document. One or more thresholds may be used to determine the information to include in the summary. For example, when the number of editing changes is below a predetermined number (e.g. 1, 5, 10, 25, 50, 100) each change may be included in the summary. When the number of editing changes is above a predetermined number less information may be included within the summary. For example, some/all of the changes may be excluded from the summary while statistical information may be included within the summary (e.g. number of edits made, number of words/paragraphs/sections changed, number of insertions, number of deletions, number of formatting changes, and the like). According to an embodiment, detailed formatting changes are not shown within the summary (an amount of formatting changes may/may not be included). More than one threshold may be used (e.g. two, three, four, five . . . thresholds may be used) and depending on a the threshold level the amount of information that is contained within the summary is modified. According to an embodiment, the verbosity of the summary information may be set by a user. For example, one user may want all changes to be shown whereas another user may only want a brief summary of changes to be shown. The summary information may also be modified based on the recipient and/or message type of the electronic message that is sent. For example, the summary information may be tailored based on a user's responsibilities for editing the document as well as if they are receiving the summary within an email or an SMS message.

The summary may be displayed and formatted within the electronic message in different ways. For example, the summary information may be placed within a table that shows the change along with a comment area that may be used to add one or more comments. According to an embodiment, the summary information is editable such that all/portion of the summary information may be changed (e.g. remove one or more changes). All/portion of the summary information may be updated in real-time. For example, the live information that is displayed (e.g. current editors of a document) may be updated as an editor begins/stops edits to a document. (See FIGS. 3-6 for example summary information).

The electronic message(s) including the summary are created automatically in response to changes made to the document. According to an embodiment, the electronic messages are emails. The electronic messages may also be a combination. For example, Reviewer 1 may specify to receive an email message with a summary of changes and also a text message with a summary of changes, whereas Reviewer 2 specifies to receive only email messages with the summary of changes.

Summary manager 26 formats the electronic messages based on a type of message being created. For example, emails may include more information as compared to text messages. When the electronic message created is a text message, the changes to the document may be spread out among a plurality of text message and/or the amount of information that is contained within the summary is reduced. Summary manager 26 may include functionality for sending/receiving messages and/or may use functionality of other message applications, such as message service 250 and/or a client message application(s) 218. As each reviewer makes changes to the documents, the electronic messages including the summaries creates a history of the changes. This assists users in seeing the changes made to a document in an electronic message (e.g. email context) summarized. These electronic messages form a change log that is recorded in electronic messages. This thread of electronic messages may be used to catch up on the changes that are made to a document over time and can be easily reviewed in a chronological format that electronic communications provide. A user having limited display capacity (e.g. mobile device) may also review the changes made to the attachment or linked document/file without having to open the document to see the changes.

A network share 230 may be used to store one or more documents. Network share 230 is accessible by the computing devices that interact with a document. The network share may be associated with an online service that supports online access/interaction with a document. For example, an online service such as document service 240 may provide online users with the ability to interact/modify documents such as word processing documents, spreadsheets, slides, and the like.

A messaging service(s) 250 may be used to process electronic messages between one or more computing devices, such as computing device 1, computing device 2 and computing device 3. The messaging service(s) 250 may be configured to process different message types, such as SMS, MMS, email, messages for social networks and the like. Messaging service 250 may be configured with the functionality of summary manager 26 and one or more message types may be used to communicate the electronic messages with the editors on a document, such as document 232. As discussed above, a combination of message types may also be used. For example, one editor may receive an email with the document attached while another editor may receive an SMS message with a link to the document. According to an embodiment, email is a default message type. A preferred message type may also be configured for the different editors. For example, each user may designate their preferred communication method (e.g. email, SMS . . . ).

Computing device 2 and computer device 3 include one or more applications, such as a web browser (222, 262) that may be configured to access a messaging services, such as a web based email service and to interact with the document through document service 240. For example, a web browser may be used to access an electronic message through an email service and then perform edits/selections to affect changes to a document, such as document 232 stored in network share 230.

As illustrated, document service 240 comprises summary manager 26 and web application 242 that comprises web renderer 244. According to an embodiment, document service 240 is configured as an online service that is configured to provide services relating to displaying an interacting with electronic documents, such as word processing document, spreadsheets, slides and the like. Web application 242 is configured for receiving and responding to requests relating to documents. For example, document service 240 may access document 232 that is stored on network share 230. Web application 242 is operative to provide an interface to a user of a computing device, such as computing device 2, to interact with a document accessible via network 18. Web application 242 may communicate with other servers that are used for performing operations relating to the document service.

Document service 240 receives requests from computing devices, such as computing devices 1-3. A computing device may transmit a request to document service 240 to interact with a document, such as a collaborated document that is being reviewed/edited by more than one author/reviewer. In response to such a request, Web application 242 obtains the document from a location, such as network share 230. The document to display is converted into a markup language format, such as the ISO/IEC 29500 format. The document may be converted by document service 240 or by one or more other computing devices. Once the Web application 242 has received the markup language representation of the document, the document service utilizes the spreadsheet Web renderer 244 to convert the markup language formatted document into a representation of the document that may be rendered by a Web browser application, such as Web browser 222 on computing device 2 and Web browser 262 on computing device 3. The rendered document appears substantially similar to the output of the word processing application 212 on computing device 1 when utilized to view the same document. Once Web renderer 244 has completed rendering the file, it is returned by the document service 240 to the requesting computing device where it may be rendered by the Web browser 222.

The Web renderer 244 is also configured to render into the markup language file one or more scripts for allowing the user of a computing device, such as computing device 2 to interact with the document within the context of the Web browser 22. Web renderer 244 is operative to render script code that is executable by the Web browser application 222 into the returned Web page. The scripts may provide functionality, for instance, for allowing a user to change a section of the document and/or to modify values that are related to the document. In response to certain types of user input, the scripts may be executed. When a script is executed, a response may be transmitted to the document service 240 indicating that the document has been acted upon, to identify the type of interaction that was made, and to further identify to the Web application 242 the function that should be performed upon the document FIGS. 3-6 show exemplary summary information and electronic messages including automatically generated summary information. FIGS. 3-6 are for exemplary purpose and are not intended to be limiting.

Figure 3:
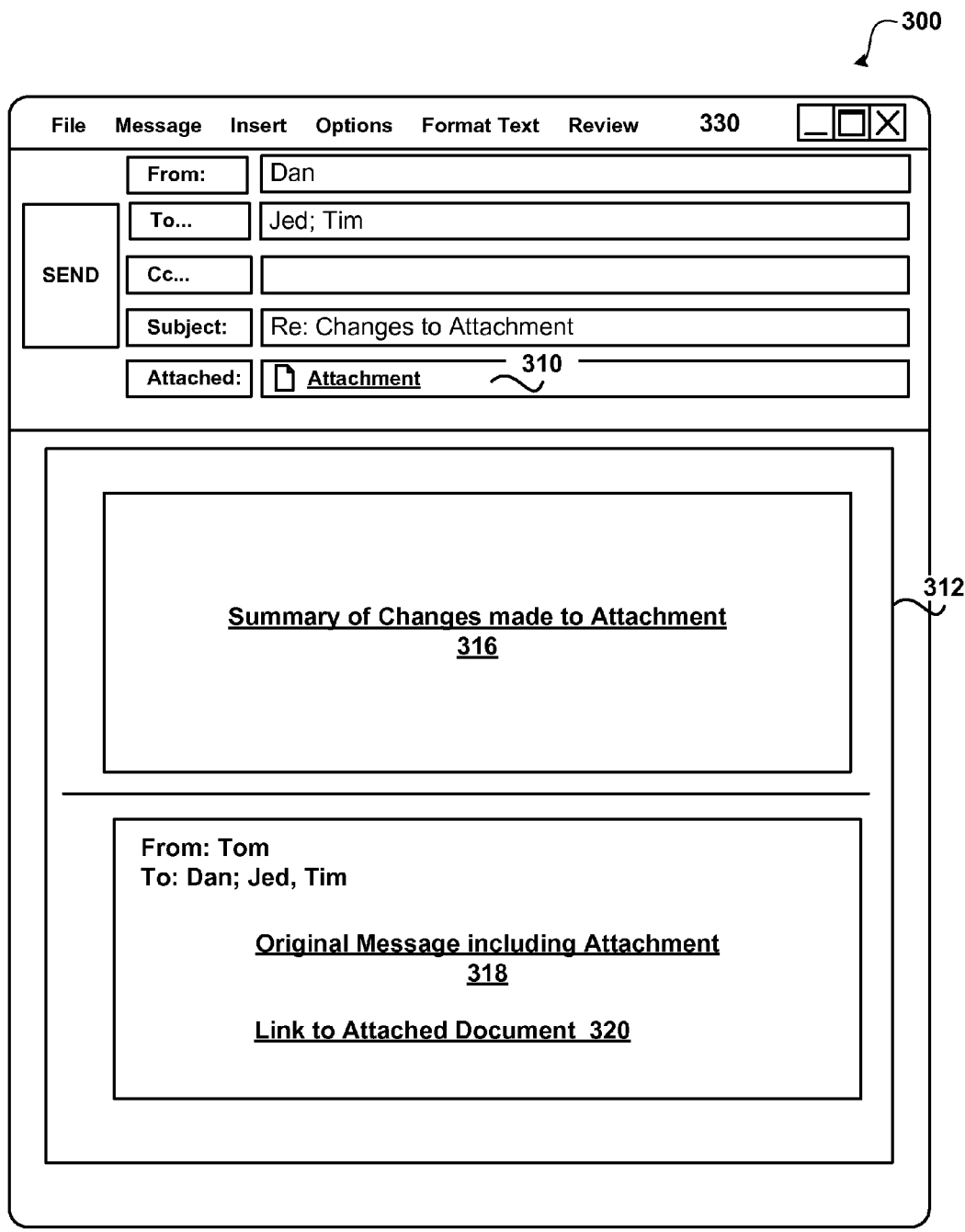
FIG. 3 shows a display of an electronic message including an automatically generated summary of changes made to a document.

FIG. 3 shows a display of an electronic message including an automatically generated summary of changes made to a document. As illustrated, message 300 includes menu bar, attachment 310, original message 318 and reply message 312 that includes summary 316. Message 300 may be created on a client, server and/or a combination of client and server.

In the example illustrated, reviewers (Dan, Jed and Tim) have received an email message (message 318) that includes attachment 310 from Tom. While message 300 shows both an attachment 310 and a link to the attachment 320 that is contained within the original message 318, message 300 may include one or both of the attachment and the link. The attachment may be any type of document that may be changed. For example, the document may be a text file, a spreadsheet, a web page, a slide presentation, a word processing document, a picture, and the like. The electronic message may be accessed a number of ways. For example, a web browser may access an electronic mail service, an email application on a computing device may be configured to receive emails from one or more different services, and the like.

As illustrated, electronic message 300 is a reply to the original message 318. Message 300 shows that the reply is from Dan and the recipients of the reply message are Jed and Tim. After receiving message 318, Dan accessed the document either by opening the attachment or by using link 320. Dan then made changes to the document. In response to making changes to the attachment/linked document, summary 316 is automatically created and inserted into reply message 300. As discussed, the summary may be configured in different manners. For example, the summary may include all/portion of the changes, document statistics, change statistics, and the like. The document statistics may include the number of changes made, the number of paragraphs changed, the number of sections that Dan is collaborating on, and the like. As discussed, more than one summary may be generated based on the recipient/message type.

Figure 4:
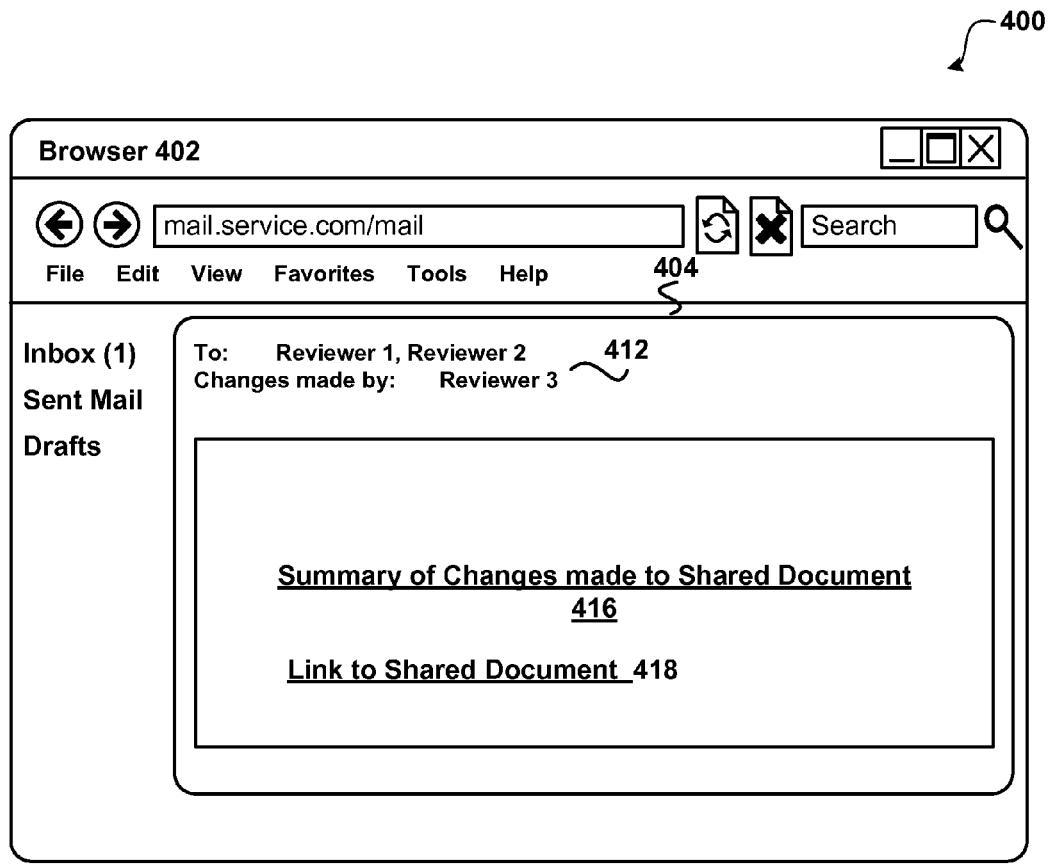
FIG. 4 illustrates an electronic message that is automatically created in response to a user making changes to a shared document.

FIG. 4 illustrates an electronic message that is automatically created in response to a user directly making changes to a shared document. As illustrated, message 400 is a Web based message 404 that is displayed within browser 402. Message 400 may be created on a client, server and/or a combination of client and server. For example, an online document service may create message 400 in response to changes made to a shared document.

In the current example, changes were made to a shared document by Reviewer 3. In response to making the changes, summary 416 was automatically generated and placed within message 404. The message may be addressed to different recipients. For example, a user editing the document may be asked the recipients to receive the electronic message that includes the automatically generated summary information. According to an embodiment, the recipients are automatically selected based on the sharing permissions of the document and the users that are assigned to review the document. A link to the shared document 418 may be included within the electronic message such that a recipient can access the shared document. An attachment may also be included within the message that may be used to make further changes to the document.

Figure 5:
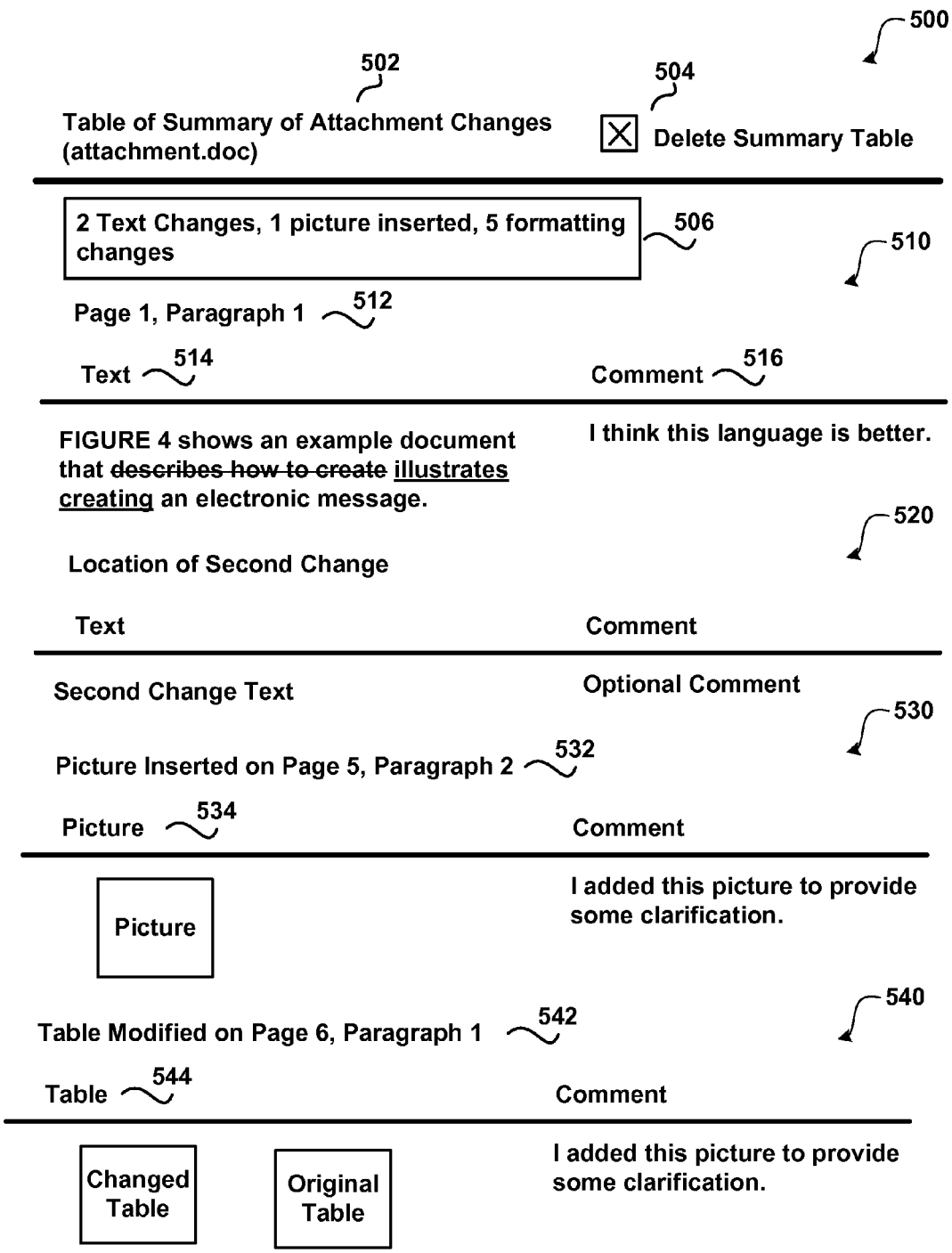
FIG. 5 shows an example of an automatically generated summary that is placed within an electronic message.

FIG. 5 shows an example of an automatically generated summary that is placed within an electronic message.

As illustrated, summary 500 includes title 502, an option to delete the summary table 504 and summary change sections 510, 520, 530 and 540. Summary 500 may include more or less information as illustrated (e.g. more or fewer summary change sections of varying types). Summary change sections may relate to text changes, picture insertions/modifications, table insertions/modifications, comments being added, last modified date, users currently editing, last edited by, state of the document (e.g. "stage 5", "Completed", "awaiting approval", "Needs attention", "Expired in X days"), and the like. Delete summary table 504 may be used to remove the entire table from the electronic message. Summary section 506 may be included within summary 500 alone or in combination with other summary change sections. For example, when there are a large number of changes made to a document, summary section 506 may be provided without providing a separate summary for each of the changes.

Summary change section 510 and summary change section 520 show a text change to the document (attachment.doc). As illustrated, location 512 provides the location within the document where the change was made. Text portion 514 shows the text change along with a portion of text before and after the change. According to an embodiment, the text change within the summary visually shows the editing to the text (e.g. strikeouts for deletions, underlining for added text, highlighting, and the like). Other information may also be shown. For example, a link may be provided within a change section that when selected opens the document at the location of the change.

A comment section (e.g. comment section 516) allows a user to insert a comment next to the change that is made to the document.

Summary change section 530 shows a picture was inserted at location 532. In the current example, a thumbnail of the picture is displayed within the summary change section 530.

Summary change section 540 shows a modification to a table at location 542 within the document. In the current example, table change 544 shows both a thumbnail of the changed table and a thumbnail of the original table. Other indicators of the changed table may also be used (e.g. mark outs, highlighting).

FIG. 6 illustrates an example of showing live information with a display of a message.

FIG. 6 shows a list of messages 600 and list of messages 650 with a summary of live information relating to the attached/linked content. As illustrated, list of messages 600 includes a messages section 610 that shows five messages (M1-M5). Displayed next to each of the messages in message section 610 is a summary of live information relating to content that is attached/linked to the electronic message. According to an embodiment, the summary of live information that is displayed next to a message listing includes a list of current reviewers of the content. For example, M1 shows that reviewers R1, R2, R3 and R4 are currently assigned to review/edit the content. M2 shows that R1 and R2 are assigned to review/edit the content. M3 shows that R5 is assigned to review/edit the content. M4 shows that R6, R7, R8 and R9 are assigned to review/edit the content. M5 shows that R1, R2 and R3 are assigned to review/edit the content.

The summary of live information that is displayed near a listing of the messages may be changed and/or configured. For example, the live summary information displayed may include information such as who is currently reviewing the content, who has last reviewed the content, when the content was changed, how the content was changed (i.e. a last change), what stage the review process of the content is currently at, who still needs to review the content, who has reviewed the content, and the like. Iconic notifications may also be displayed to provide live information relating to the content. In the current example, message M2 shows an icon indicating that the content is in the approval stage. M3 shows that the status of the message is sent to urgent, and M4 shows that the state of the content review is in the final review process.

According to an embodiment, when a message is selected (e.g. message M1) and opened, a display is provided that includes additional live information. In the current example, live information 624 is displayed that shows that the content is currently being reviewed by R1 and R3. Comments are also provided within the display of message M1 showing that R2 has requested that the selected text be looked at by the reviewers and that the recipient who selected message M1 has requested the reviewers to look at the document. Other information may be displayed when a message is selected (e.g. See FIG. 5 and related discussion).

Message listing 650 shows a display of messages M1-M5 with exemplary summary information shown next to each message. As illustrated, M1 shows that R1, R2, R3 and R4 are currently assigned to review/edit the content that is attached/linked to the message and that the content is currently being edited by R1 and R3.

M2 shows that R1 and R2 are currently assigned to review/edit the content and that the content was last edited at 10:02 am by reviewer R2 and that 100 words changed as a result of the editing.

M3 shows that R5 is currently assigned to review/edit the content and that the content is currently being edited by R5.

M4 shows that R6, R7, R8 and R9 are currently assigned to review/edit the review process is in the final review stage and that R7 and R8 have approved the content and that R6 and R9 still need to approve the content.

M5 shows that R1, R2 and R3 are currently assigned to review/edit the content and that no edits have been made to the content.

Figure 7:
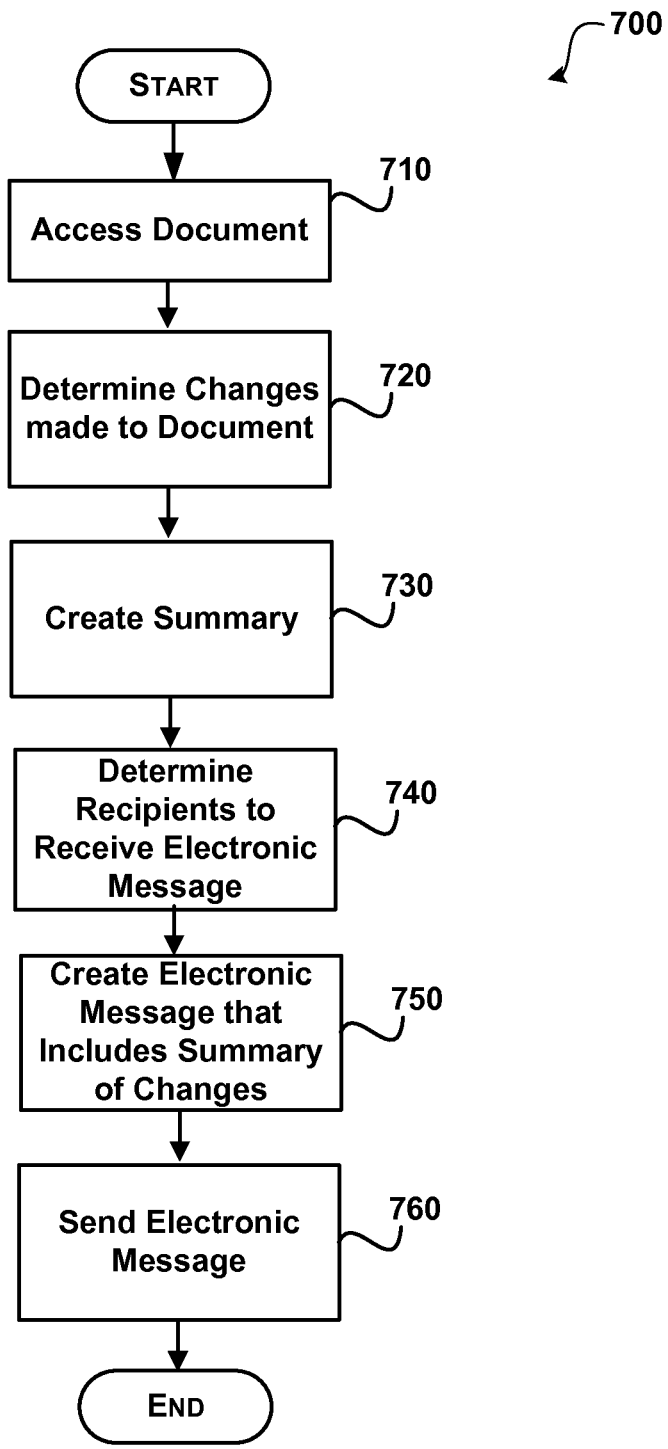
FIG. 7 illustrates a process for creating an electronic message and including a summary of changes made to a document.
Figure 8:
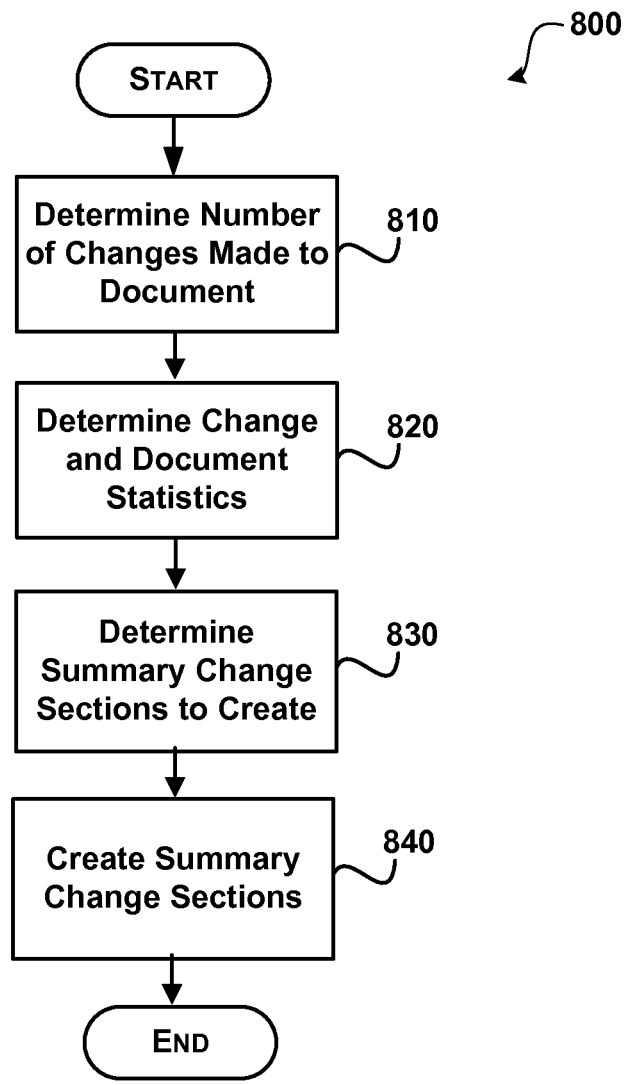
FIG. 8 shows a process for creating a summary of changes made to a document.
Figure 9:
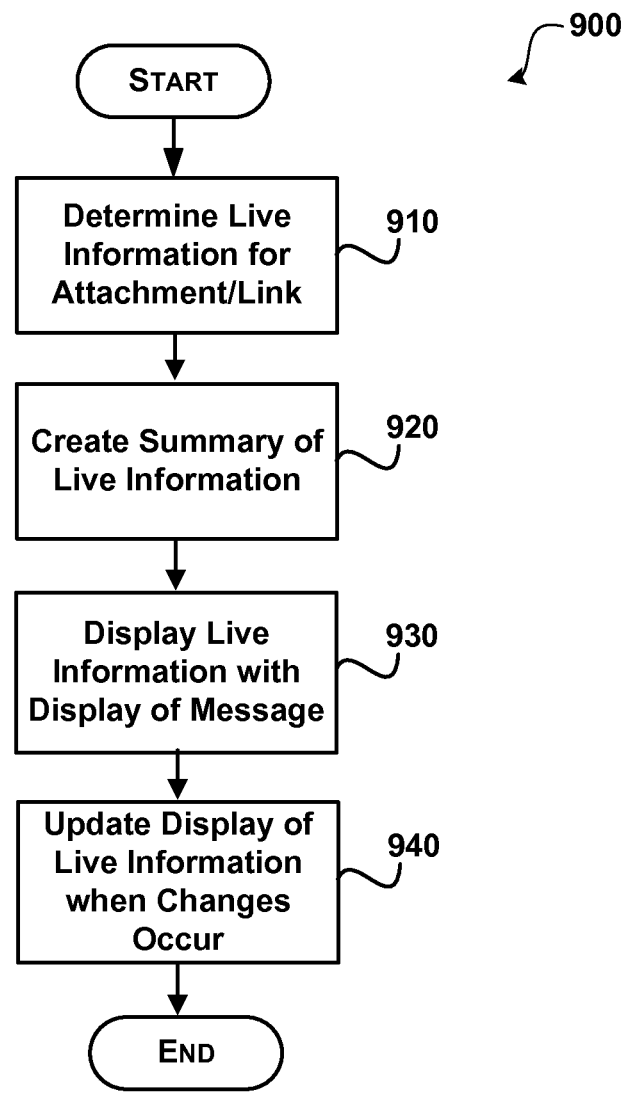
FIG. 9 illustrates a process for displaying messages with live information.

FIGS. 7 and 8 show an illustrative process for inserting automatically generated summaries of changes to documents within electronic messages. FIG. 9 shows displaying live information with one or more messages. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

FIG. 7 illustrates a process for creating an electronic message and including a summary of changes made to a document.

After a start block, process 700 moves to operation 710, where the document is accessed. According to an embodiment, the document is accessed by opening an attachment to an electronic message to which changes are made by a recipient. The document may also be accessed by selecting a link within an electronic message and/or directly accessing the document at a shared location.

Flowing to operation 720, the changes to the document are determined. Generally, the changes relate to content changes of the document. The changes, however, may also include changes to formatting and/or metadata that is associated with the document. According to an embodiment, the changes are tracked as they are being made to the document. The changes may be determined using other methods. For example, the changes may be determined after a predetermined condition has occurred (e.g. after a save, before a message including the document is sent, and the like). A combination of approaches may also be used (e.g. determine differences between original document at a first time and track changes as they are being made after that time). According to an embodiment, a table is created that is modified as changes are made to the document.

Moving to operation 730, a summary is created that summarizes the changes that are made to the document. The summary may be configured to include different information. For example, the summary may include all of the changes made to the document, a portion of the changes made to the document and/or statistical information relating to the changes to the document. According to an embodiment, the amount of information included in the summary depends on the number of changes made to the document and a type of electronic message that includes the summary. For example, an SMS message will include a less detailed summary (e.g. statistical information) whereas an email message generally will include more detailed information (e.g. summary of changes and statistical information). According to an embodiment, detailed formatting changes are not shown within the summary (an amount of formatting changes may/may not be included). According to an embodiment, the summary information is included within an editable table that includes an area that allows a user to enter comments near the changes. The summary may be formatted in other ways. For example, all/portion of the summary may be in the form of: pictures, bullet points, text, tables, spreadsheets, and the like. According to an embodiment, the verbosity of the summary information may be set by a user (e.g. the current editor, a recipient, and/or some authorized user). For example, one recipient may want to see all changes made to a document within the summary whereas another user may only want a brief summary of changes to be shown. The summary information may also be modified based on potential recipients. For example, the summary information may be tailored based on the responsibilities that are assigned to each of each collaborator for the document. According to an embodiment, each of the changes that are included within the summary include portions of the document that come before the change and after the change in order to help provide context for the change.

Transitioning to operation 740, a determination is made as to what recipients are to receive the electronic message that includes the summary. Each reviewer on the document may receive the electronic message or a portion of the reviewers may receive the electronic message. For example, the electronic message may be sent to only the recipients that are authorized to collaborate on the section(s) of the document to which the changes were made.

Moving to operation 750, one or more electronic messages are created that include the summary information. For example, different message types may be created and/or different summary information may be included within the electronic messages. According to an embodiment, when the document is accessed through an electronic message, a reply to the electronic message is created to include the summary.

Flowing to operation 760, an electronic message is sent to each of the determined recipients. The message is sent using the appropriate method depending on the type of message (e.g. email, SMS, MMS, and the like).

The process then flows to an end block and returns to processing other actions.

FIG. 8 shows a process for creating a summary of changes made to a document.

After a start block, process 800 moves to operation 810, where the document is parsed to determine a number of changes that are made by the current editor. Many different methods may be used for determining the changes. For example, an application/process may keep track of the changes within the document, a difference comparison may be made between the current state of the document and a previous version of the document, and the like.

Flowing to operation 820, statistics relating to the document changes are determined. Many different types of statistics may be determined. For example, number of characters changed, words changed, lines changed, paragraphs changed, sections changed, pages changed, comments added, highlighting added/removed, pictures inserted/deleted, tables inserted/deleted, formatting changes, and the like.

Moving to operation 830, a determination is made as to what summary change sections are to be created. The summary changes sections that are created may change based on a different conditions (e.g. message types to be created, number of changes made, and the like). One or more thresholds may be used to determine the information including a type/number of summary change sections to include in the summary. For example, when the number of editing changes is below a predetermined number each change may be included in the summary. When the number of editing changes is above a predetermined number less information may be included within the summary. For example, some/all of the changes may be excluded from the summary while statistical information may be included within the summary. More than one threshold may be used to determine a level of summary information.

Transitioning to operation 840, the determined summary change sections are created. The formatting of the summary change sections may change from one message type/recipient to the next. For example, an email message may include more formatting as compared to an SMS message. Similarly, one user may request summaries formatted at one level of formatting whereas another user may request that the summaries formatted at a different level of formatting.

The process then flows to an end block and returns to processing other actions.

FIG. 9 illustrates a process for displaying messages with live information.

After a start block, process 900 moves to operation 910, where live information for the content (linked/attached) is determined. Generally, the live information relates to information that reflects a current state of the content. For example, the live information may include who is currently accessing/reviewing the content, who has reviewed the content, who has made changes/comments to the content, who still needs to review the content, a current state/stage of the content (i.e. draft stage, final review stage); who is/are the current reviewer(s) assigned to the document, a number of changes made, a number of sections changed, and the like.

Moving to operation 920, a summary of the live information is created. The summary may include one or more items of information relating to the content. According to an embodiment, the created summary includes a name of the user(s) that are currently editing the content. More than one summary may be created and may include other/additional information and may change depending on where the summary is to be displayed.

Flowing to operation 930, the summary of the live information is displayed with one or more messages. For example, when the summary is displayed with a display of a list of messages a first summary may be displayed (e.g. users assigned to review/edit content). When one of the messages is selected, a second summary may be displayed (e.g. who is currently editing the document, most recent changes, comments, etc. . . . ). According to an embodiment, the live information is configurable. For example, a user may specify using a user interface the live information that they would like to display with a display of a message and/or a list of messages.

Transitioning to operation 940, the display of the live information is updated as changes occur to the live information. For example, the live information may change when a reviewer begins/ends a review session, the document moves to another stage in the review process, an action is needed, a content change is made, and the like.

The process then flows to an end block and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for summarizing changes to a document within an electronic message, comprising:
    determining changes that are made to a document;
    automatically creating a summary of the changes that are made to the document that includes live summary information comprising reviewers currently reviewing the document, one of editors currently editing the document or editors who have edited the document, and one of who has approved the document or who needs to approve the document, wherein the live information is automatically updated when the live information changes;
    creating an electronic message that includes the summary of the changes made to the document including the live information for display with the electronic message;
    sending the electronic message to at least one recipient; and
    updating the live summary information including information associated with: the reviewers currently reviewing the document and a review stage of the document, the one of editors currently editing the document or editors who have edited the document, and the one of who has approved the document or who needs to approve the document after sending the electronic message such that updated live summary information is displayed with the display of the electronic message on a display that is associated with the at least one recipient.

2. The method of claim 1, further comprising receiving an electronic message that includes the document as an attachment.

3. The method of claim 2, wherein creating the electronic message comprises creating a reply to the received electronic message that includes the summary of the changes.

4. The method of claim 1, wherein creating the summary of the changes comprises determining a number of changes made to the document and when the number of changes to the document is below a first threshold including each non-formatting change within the summary and when the number of changes to the document is above the first threshold including a statistical representation of the changes within the summary.

5. The method of claim 1, wherein determining changes that are made to the document comprises storing each of the changes in response to the change as they are being made to the document.

6. The method of claim 1, wherein creating the summary comprises creating an editable table including the changes that is inserted into a body of the electronic message before it sent.

7. The method of claim 6, wherein the summary includes a comment area that is used to enter a comment relating to a corresponding change in the summary.

8. The method of claim 1, wherein creating the summary comprises including a predetermined amount of content of the document before each change and after each change and indicating changes within the summary of the change.

9. The method of claim 1, further comprising creating a summary of live information that is displayed next to a display of an unopened message and is automatically updated when the live information changes.

10. A computer-readable storage medium, excluding a signal, storing computer-executable instructions for summarizing changes to an attachment of electronic messages, comprising:
    receiving an electronic message that includes an attached document;
    determining changes that are made to the attached document;
    automatically creating a summary of the changes that are made to the document;
    creating an electronic message that includes the summary of the changes made to the document and live summary information for display with the electronic message that is automatically updated when the live information changes, wherein the live summary information includes reviewers currently reviewing the document, one of editors currently editing the document or editors who have edited the document, and one of who has approved the document or who needs to approve the document;

sending the electronic message to at least one recipient; and updating the live summary information including information associated with: the reviewers currently reviewing the document and a review stage of the document, the one of editors currently editing the document or editors who have edited the document, and the one of who has approved the document or who needs to approve the document after sending the electronic message such that updated live summary information is displayed with the display of the electronic message on a display that is associated with the at least one recipient.

11. The computer-readable storage medium of claim 10, further comprising displaying live information that is displayed with a display of an unopened electronic message that is automatically updated when the live information changes.

12. The computer-readable storage medium of claim 10, wherein creating the summary of the changes comprises determining a number of changes made to the document and creating summary change sections based at least in part on the number of changes.

13. The computer-readable storage medium of claim 10, wherein determining changes that are made to the document comprises storing each of the changes in response to the change as they are being made to the document.

14. The computer-readable storage medium of claim 10, wherein creating the summary comprises creating an editable table including the changes and a comment area.

15. The computer-readable storage medium of claim 10, wherein creating the summary comprises including a predetermined amount of content of the document before each change and after each change and indicating changes within the summary of the change.

16. The computer-readable storage medium of claim 10, wherein creating the summary comprises including a location within the document for each of the changes that are included within the summary.

17. A system for summarizing changes to an attachment of electronic messages, comprising:
a network connection that is configured to connect to a network;
a processor, memory, and a computer-readable storage medium;
an operating environment stored on the computer-readable storage medium, excluding a signal, and executing on the processor;
a messaging application that receives an electronic message including an attachment; and
a summary manager operating in conjunction with the operating environment that is configured to perform actions comprising:
determining changes that are made to the attachment;
automatically creating a summary of the changes that are made to the attachment;
creating a summary of live information that is included within an electronic message that is automatically updated when the live information changes, wherein the live information includes reviewers currently reviewing the document, one of editors currently editing the document or editors who have edited the document, and one of who has approved the document or who needs to approve the document;
inserting the summary of the changes and the summary of live information within the electronic message for display with the electronic message;
sending the electronic message to at least one recipient; and
updating the summary of live information including information associated with: the reviewers currently reviewing the document and a review stage of the document, the one of editors currently editing the document or editors who have edited the document, and the one of who has approved the document or who needs to approve the document after sending the electronic message such that updated live summary information is displayed with the display of the electronic message on a display that is associated with the at least one recipient.

18. The system of claim 17, wherein creating the summary of the live information comprises determining at least one of: users who are currently reviewing the document, users assigned to the document, and a current state of review.

19. The system of claim 17, wherein determining changes that are made to the document comprises storing each of the changes in response to the change as they are being made to the document.

20. The system of claim 17, wherein creating the summary comprises including a location within the document for each of the changes that are included within the summary and a comment area.

* * * * *